United States Patent [19]

Hirahara et al.

[11] Patent Number: 4,692,812
[45] Date of Patent: Sep. 8, 1987

[54] PICTURE IMAGE READER

[75] Inventors: Shuzo Hirahara, Yokohama; Kiyoshi Yamada, Tokyo; Kazuhiko Higuchi, Kawasaki; Tutomu Saito, Kanagawa, all of Japan

[73] Assignee: Kabushiki Kaisha Toshiba, Kawasaki, Japan

[21] Appl. No.: 837,846

[22] Filed: Mar. 10, 1986

[30] Foreign Application Priority Data

Mar. 26, 1985 [JP] Japan ............................... 60-059358
Oct. 28, 1985 [JP] Japan ............................... 60-240966

[51] Int. Cl.$^4$ ............................................. H04N 1/04
[52] U.S. Cl. .................................... 358/285; 358/293; 358/294
[58] Field of Search ............... 358/285, 293, 294, 213, 358/280

[56] References Cited

U.S. PATENT DOCUMENTS 4,149,091 4/1979 Cream et al. ...................... 358/285
4,393,410 7/1983 Ridge et al. ....................... 358/285

Primary Examiner—Edward L. Coles, Sr.
Attorney, Agent, or Firm—Schwartz, Jeffery, Schwaab, Mack, Blumenthal & Evans

[57] ABSTRACT

The present invention is aimed at reading picture image information of an original by illuminating the original with light and by receiving the transmitted or reflected light from the original. The picture image reader in accordance with the present invention includes an optical sensor for reading picture image information by receiving light from the original that is illuminated by light, a moving mechanism for relatively moving the optical sensor and the original, an overlapping mechanism for overlapping a portion of the reading region for picture images, in the reading of picture images by the optical sensor, and a synthetic picture image formation circuit for synthesizing picture image of the overlapped portion so as to have the picture image coincident with the picture image in the original, based on each picture image information that are read in overlapped manner. The overlapping mechanism comprises a control unit for controlling the moving mechanism so as to let the optical sensor read a portion of the region of picture images and/or a rod array lens arranged so as to have the images of a portion of the picture image of the original imaged in overlapped manner on the optical sensor that are composed of at least two of line image sensors. In addition, the synthetic picture image formation circuit comprises at least two of coefficient circuits for multiplying each of the picture image information of the overlapped portion with predetermined coefficients in order to weight the picture image information, and an adder for summing the weighted picture image information from each of the coefficient circuits.

18 Claims, 32 Drawing Figures

PICTURE IMAGE READER

BACKGROUND OF THE INVENTION

1. Field of the Invention

The present invention relates to a picture image reader in facsimile, for example, which reads the picture image information in a color original by irradiating the original to be transmitted and by receiving the reflected or transmitted light from the oringal.

2. Description of the Prior Art

In facsimile and others, for reading picture images of an original to be transmitted, use is generally made of a solid sensor array consisting of CCD sensor or the like with wide reading width that can read a plurality of lines simultaneously. With such a device, there has been known a reading method in which, as shown in FIG. 1, the picture image information of the original 10 corresponding to the reading width of the sensor array is scanned electronically or mechanically in a first direction, namely, the main scanning direction, in one reading operation in the main scanning direction. Then, the original is moved by a predetermined distance, namely, by the amount of a pitch that corresponds to the reading width of the sensor array, in the subscanning direction which is perpendicular to the main scanning direction, to carry out the next reading operation in the main scanning direction. The reading operation of the original for the device consists of a repetition of the scanning operation as described in the above.

Now, for reading picture images in the main scanning direction by means of a sensor array, there are known also several other methods. Namely, a method in which use is made of a reducing optical system whose lens is utilized for illuminating the picture image reading area of the original, as well as for focusing the picture images corresponding to the full length in the main scanning direction by reducing the length, in order to let the sensor array receive the reflected light from the picture image in the original. Another is an erecting, unit-magnification, and contact imaging method which supplies picture image information to the sensor array via a rod lens array which is arranged to the full width in the main scanning direction, with one end of the array facing the reading position of the picture image of the original and the other end facing the sensor array. Still another is a series reading method which reads the picture image information by scanning the original in series successively in the main scanning direction by moving the sensor array in the main scanning direction. Here, the method of utilizing a reducing optical system and the method of erect, unit-magnification, and contact imaging type are the methods of scanning the original electorically in the main scanning direction. However, there are drawbacks such as, in the method of utilizing a reducing optical system, the structure of the device becomes bulky due to increase in the optical length for the lens, and in the method of erect, unit-magnification, and contact imaging type, it becomes costly due to the necessity of using a plurality of CCD sensors that correspond to the width in the main scanning direction. In contrast, the series reading method is a method in which scanning in the main scanning direction is carried out mechanically, so that it has an advantage that the device can be made compact and economical.

Hence, in constructing a color facsimile unit, it is desirable from the viewpoint of economy and miniaturization to adopt the series reading method which reads the picture image information in the original in succession by scanning the original in series along the main scanning direction while moving the sensor array in the main scanning direction.

However, the series reading method has a drawback in that the operation of reading by scanning takes too long a time because it reads the picture images by scanning the original in succession in continuous manner.

Moreover, in reading the original by scanning the original in the main scanning direction, in one reading scan it reads the picture images in the region that corresponds to the reading width of the sensor array, and in a subsequent similar reading scan in the main scanning direction it reads the picture images in the region that corresponds to the reading width of the sensor array. In this way, in each reading scan it reads the picture images that are located in the region corresponding to the reading width of the sensor array. When each of the picture image information with a width of region that is read in succession, is arranged in regular order along the subscanning direction, it forms a reproduction of the original picture images in the original. However, there is a problem that the picture image information read by the sensor that is on one edge section of the sensor array differs from that read by the sensor that is on the other edge section, even if the same picture image is read by both of them. This is due to the difference in characteristics of sensors on both edge sections of a sensor array with fixed reading width, difference in illumination and difference in precision of mechanism at both edge sections, such as the difference in the distances from each of the sensor on both edge sections to the original and the difference in shading corrections. Because of this, if each picture image information read is simply arranged in regular order in the direction of subscanning, there is generated a discontinuity at each boundary of picture images, namely, at the boundary of each main scanning. It then leads to a result that the picture image is distorted unnaturally due to the discontinuity. In particular, in the case of color picture images, there are generated not only variable density in the picture image but also a difference in the hue, so that the distortion becomes more conspicuous.

Further, there is another method, as shown in FIG. 2, in which picture images are read by a plurality of line sensors 14 and 16 placed separated in the direction of main scanning. In this method, the portion 19 of the picture elements, which is the overlap between the two sensors, is processed in which the two output signals for picture images that are output from the sensors 14 and 16 are switched electrically to form one line of continuous output signal for picture images, with an arbitrary picture element in the overlapped picture elements as boundary.

However, according to the system, there are output picture image signals that are different with the juncture as the boundary due to scatter in the electrical characteristics (namely, nonlinear characteristics, offset, and so forth) of each line of sensors, which produces a juncture in the reproduced picture images.

Namely, human vision has a special feature that it has a very high ability of detecting the relative difference between two images that are displayed for comparison so that if the juncture of the output signals from the two line image sensors becomes noticeable, then the image is perceived as a band-like unevenness with width that corresponds to the length of the sensors in the main scanning direction, which is an unsightly image.

In particular, human eyes are more sensitive to the difference in hue than to the difference in brightness. Then, in a color image reader, if there is a scatter in the electrical characteristics in the line image sensors or a scatter in the spectroscopic characteristics of color filters that are placed in front of each of line image sensor, then the juncture between the output signals from the line image sensors becomes very conspicuous. Since it is difficult to suppress these scatters to a low level by selection or combination alone of image sensors or color filters, there is a problem that the burden on the price is high also.

SUMMARY OF THE INVENTION

An object of the present invention is to provide a picture image reader which is capable of generating a picture image information that can reproduce high quality picture images that do not give rise to distortions in the boundary sections of the reading scans, obtained from the picture images in the original by reading through scanning.

Another object of the present invention is to provide a picture image reader which enables fast reading operation of the picture images in the original.

In a picture image reader which reads the picture image information in the original by receiving transmitted or reflected light from the original which is illuminated, a special feature of the present invention lies in that it comprises an optical sensor which reads picture image information by receiving light from the original that is illuminated, an optical sensor transporting mechanism which makes the optical sensor to scan in a first direction relative to the original, an original transporting mechanism which transports the original in a second direction that is perpendicular to the first direction whenever the optical sensor completes scanning in the first direction, at least two coefficient circuits equipped with a control unit which controls the original transporting mechanism so as to move the original in the second direction by a distance which is less than the reading width $W_r$ of the optical scanner in the second direction, in order for the optical sensor to be able to read the picture image reading region in an overlapping manner, and a synthetic picture image formation circuit which synthesizes images in the overlapped section, in order to have images that coincide with those in the original, based on each picture image information that is read by the optical sensor in an overlapping manner, and the above-mentioned synthetic picture image formation circuit weights each picture image information in the overlapped section by multiplying it with a predetermined coefficient, and an adder which adds the weighted picture image information that are sent from each of the coefficient circuits.

These and other objects, features and advantages of the present invention will be more apparent from the following description of the preferred embodiments in conjunction with the accompanying drawings.

DESCRIPTION OF THE PREFERRED EMBODIMENTS

Figure 1:
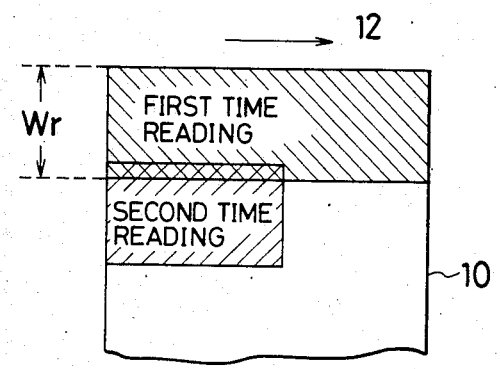
FIG. 1 is a simplified diagram for illustrating one scanning method in the reading operation that uses a sensor array.
Figure 2:
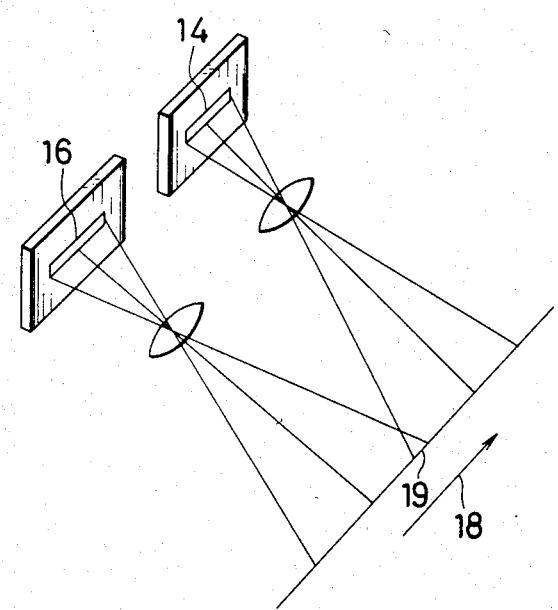
FIG. 2 is a simplified diagram for illustrating the structure of the sensor for another scanning method in the reading operation.
Figure 3:
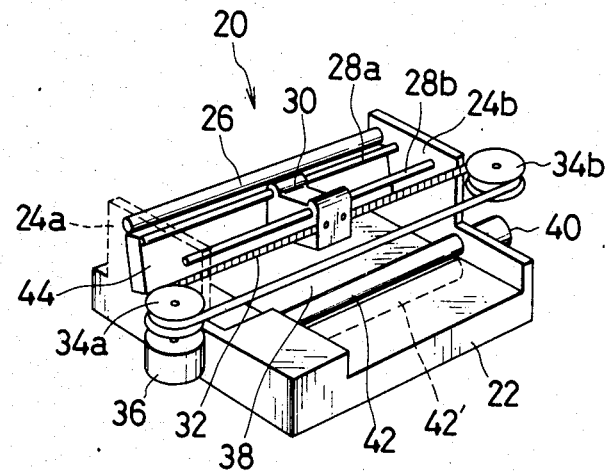
FIG. 3 is a perspective view of a color facsimile which employs a picture image reader that embodies the present invention.

Referring to FIG. 3, there is shown a color facsimile unit employing a picture image reader embodying the present invention, with reference numeral 20. In the color facsimile unit 20, both ends of the main body 22 are bent upward to form the side wall sections 24a and 24b. Supported its both ends between the upper edges of the side wall sections 24a and 24b is a fluorescent lamp 26. Underneath and parallel to the fluorescent lamp 26 there are supported a pair of guide rails 28a and 28b that are separated in parallel by a predetermined distance. At around the middle of these guide rails 28a and 28b there is arranged a carriage 30 that is housing a rod array lens and CCD sensor in its inside, for reading the picture image information. Further, on the carriage 30 there is fixed with screws or others a belt 32 which extends parallel to the guide rails 28a and 28b, and the belt 32 is wound around a pair of pulleys 34a and 34b that are arranged at left and right sides of the areas near the side wall sections 24a and 24b. The central part of the left-side pulley 34a is linked to the drive shaft of a motor 36 which is controlled by a control unit that will be described later. When the motor rotates, the pulley 34a is rotated to move the belt 32, and by this action, the carriage 30 is moved and scans the area between the side wall sections 24a and 24b in the main scanning direction along the guide rails 28a and 28b. Between the side wall sections 24a and 24b of the main body 22 and below the carriage 30 is arranged an original to be transmitted, opposing the bottom surface of the carriage 30. The edges of the original 38 are held between the original feeding rollers 42 and 42' that are arranged freely rotatably across the side wall sections 24a and 24b of the main body, and are set to be driven to rotate by a motor 40 that is controlled by the control unit, as will be described later. When the rollers 42 and 42' are rotated, the original 38 that is being held between the rollers 42 and 42' is fed in the subscanning direction which is perpendicular to the main scanning direction, that is, in the direction toward the rear of the main body 22 in FIG. 3. Moreover, directly beneath the fluorescent lamp 26 there is arranged a platelike light-guiding member 44, made of a rectangular transparent material, that is supported in parallel to the fluorescent lamp 26, extending between the side wall sections 24a and 24b. One end surface of the longitudinal direction of the platelike light-guiding member 44 faces the fluorescent lamp 26 at a close distance, while its opposite end is positioned between the carriage 30 and the original 38. With this arrangement, light from the fluorescent lamp 26 impinges upon the inside of the light-guiding member 44 through one of its ends that faces the fluorescent lamp 26, and is set to irradiate the picture image reading area of the original 38 which is placed beneath the carriage 30, from the other end via the light-guiding member 44.

Figure 4:
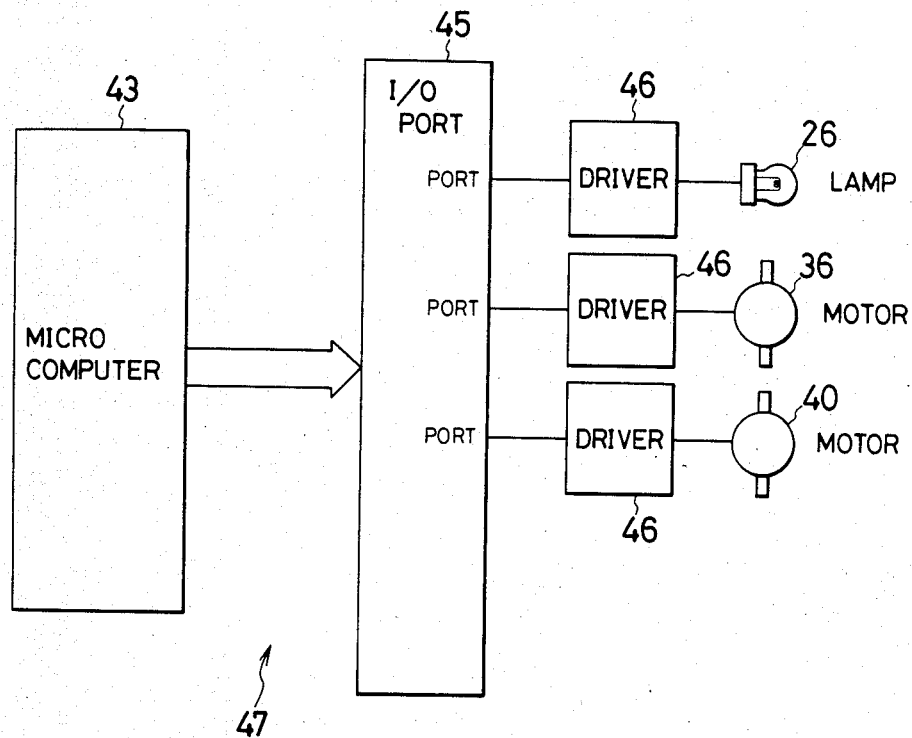
FIG. 4 is a block diagram for the control unit which controls the motors and the fluorescent lamp shown in FIG. 3.

Referring to FIG. 4, there is shown a control unit 47 which consists of a microcomputer 43, I/O ports 45, and drivers 46. With the control unit 47, the operations of the motor 36 that moves the carriage 30, the motor 40 that moves the original, and the fluorescent lamp 26 are controlled.

Figure 5:
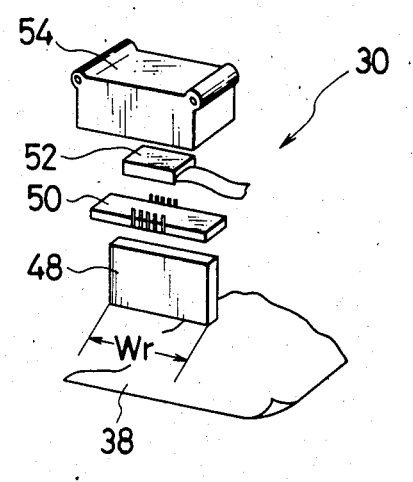
FIG. 5 is a disassembled perspective view of the carriage in the device shown in FIG. 3.

The carriage 30 consits, as shown by a disassembled perspective view, FIG. 5, of a rod array lens 48 that has an array structure which is long in the subscanning direction with a reading width Wr, having one of its ends arranged to face the original 38 at a close distance, a CCD sensor array 50 which is arranged to make a close contact with the other end of the rod array lens 48, having an array structure consisting of a plurality of sensors that are arranged long in series in the subscanning direciton, with reading width Wr, similar to the rod array lens 48, for reading picture image information from the original 38 via the rod array lens 48, a connector 52 connected to the CCD sensor array 50, and a carriage case 54 which houses each of these parts. The picture image information of the original 38 that is read by the CCD sensor array 50 via the rod array lens 48 is provided from the connector 52 to the picture image synthetic processing circuit that will be described later. Since the CCD sensor array 50 and the rod array lens 48 have, as shown in the figure, a reading width Wr which is long in the subscanning direction, when they are moved by the belt 32 as mentioned earlier to scan to read the picture images of the original 38 in the main scanning direction, it is possible to read at once the picture images in the region that corresponds to the reading width Wr in one operation.

In a picture image reader that is constructed as in the above, when the carriage 30 is moved in the main scanning direction to read the picture image information in the original 38 via the pulleys 34a and 34b and the belt 32 by the roataion operation of the motor 36 under the control of the control unit 47, light from the fluorescent lamp 26 is transmitted via the light-guiding member 44 to illuminate the picture image reading area of the original 38 that faces the bottom section of the carriage 30. As a result, the reflected light from the picture image of the original 38 that is illuminated by light through the light-guiding member 44 is detected by the CCD sensor array 50 via the rod array lens 48, and the picture images in the region that corresponds to the reading width Wr are read at once.

When the carriage 30 completes the reading and scanning action from one end to the other end of the main scanning direction by the rotation of the motor 36, the carriage 30 is brought back to the original position by the action of reverse motion of the motor 36. At the same time, the original is sent out by a fixed distance in the subscanning direction by the rotation action of the rollers 42 and 42' for feeding the original. When the feeding action in the subscanning direction is completed, there will be started again by the motor 36 the reading action through the carriage 30 in the main scanning direction, and similar operation will be repeated thereafter. The picture image information that is read by the CCD sensor array 50 in the repeated reading operation is supplied to the picture image synthetic processing unit that will be described later.

Figure 6A:
FIGS. 6a and 6b are diagrams for illustrating the scanning method in the device shown in FIG. 3.
Figure 6B:
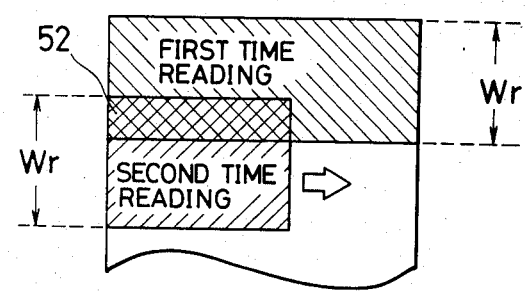

In this case, after picture images in the region that corresponds to the reading width Wr are read in one scanning operation of the CCD sensor array of the carriage 30 in the main scanning direction, and the original 38 is fed in the subscanning direction by the action of the rollers 42 and 42' for feeding original, if the distance of feeding equals the length corresponding to the reading width Wr, then all of the picture images will be read completely without missing any. In this embodiment, however, feeding length of the original 38 is controlled via the motor 40 and the rollers 42 and 42' to be less than the length that corresponds to the reading width Wr. In this way, it is designed to read the same image portion 52 once in one reading operation in the main scanning direction and again in the next scanning operation in the main scanning direction, as shown in FIG. 6. Namely, after first reading operation with reading width Wr is done as shown by FIG. 6a, second reading operation is carried out so as to have an overlapped portion of picture image 52 as shown by FIG. 6b. With such an arrangement, all the reading operations will have overlapped portions. Therefore, by forming synthesized images by applying processings that will be described later to the overlapped sections 52, the present invention aims at removing the distortion in the picture images that used to be generated at the boundaries of each operation of reading by scanning.

Figure 7:
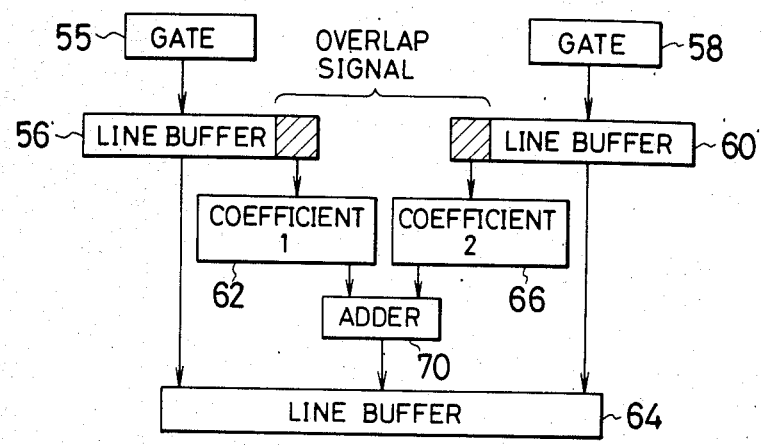
FIG. 7 is a block diagram for the picture image synthetic processing circuit in the first embodiment shown in FIG. 3.
Figure 8:
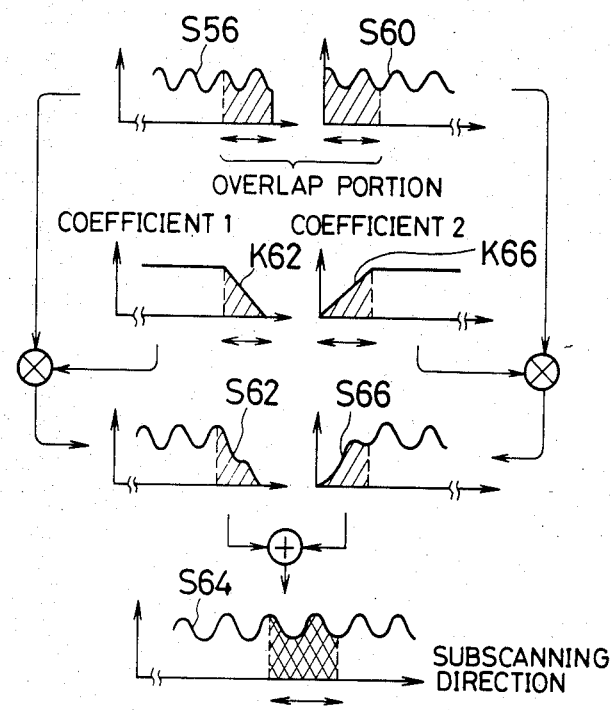
FIG. 8 is a diagram for illustrating the operation of the picture image synthetic processing circuit shown in FIG. 7.

Referring to FIG. 7, there is shown a picture image synthetic processing circuit for forming synthesized picture images at the overlapped sections that represent the boundaries of the picture image scannings. In FIG. 8, there is shown a diagram for illustrating the operation of the circuit.

As shown in FIG. 7, a preceding picture image information that is read in a first reading operation is memorized via a gate 55 in a line buffer 56 which consists, for instance, of a flip-flop or a memory circuit. Similarly, a succeeding picture image information that is read in a second reading operation is memorized in a line buffer 60 via a gate 58. The picture image information that is memorized in the line buffer 56 or the line buffer 60 is that which is read by the CCD sensor 50 with reading width Wr in one operation of the carirage 30 in the main scanning direction. Each of the line buffers 56 and 60 memorizes the picture image information in the direction of reading width of the sensor array 50 (namely, the subscanning direction). Therefore, the picture image information S56 and S60 (see FIG. 8) that are output from each line buffers 56 and 60 are output in parallel in the direction of the reading width. In the picture image information S56 and S60 shown in FIG. 8, the abscissas correspond to the direction of the reading width, while the ordinates show the levels of the picture image information that are output from the line buffers 56 and 60. As to the preceding picture image information S56 that is memorized in the line buffer 56, there are given hatches on the right-hand end sections of the line buffer 56 in FIG. 7 and the picture image information S56 in FIG. 8. For the succeeduing picture image information S60 that is memorized in the line buffer 60, there are given hatches on the left-hand end sections of the line buffer 60 in FIG. 7 and the picture image information S60 in FIG. 8. These hatched portions represent, as mentioned above, the overlapped picture image portion 52 in the direction of the reading width, between the first reading operation and the second reading operation.

In FIG. 7, the picture image information from the predetemrined portion (hatched portion) in the line buffer 56 is supplied to a first coefficient circuit 62, and the remaining picture image information of the line buffer 56 is supplied directly to the output line buffer 64 without going through the coefficient circuit 62. Similarly, the picture image information from the predetermined overlapped portion (hatched portion) in the line buffer 60 is supplied to a second coefficient circuit 66, and the other picture image information is supplied directly to the output line buffer 64 without going through the coefficient circuit 66. The outputs from the coefficient circuits 62 and 66 are added in an adder 70 to be supplied to the output line buffer 64. Each of the coefficient circuits 62 and 66 weights the picture image information of the overlapped portion supplied respectively by the line buffers 56 and 60 with predetermined coefficients K62 and K66. By adding and averaging in the adder 70 the weighted quantities obtained by the multiplication with the coefficients K62 and K66, the present invention aims at eliminating unnatural sight from the boundaries in the picture image information by obtaining picture image information that coincides with the picture images in the original.

For that purpose, the first coefficient circuit 62 possesses a coefficient K62, as shown in FIG. 8, which is sloped down gradually toward right in the reading width direction of the figure. Further, the second coefficient circuit 66 possesses, as shown by FIG. 8, a coefficient K66 which slopes down gradually toward left in the reading width direction of the figure, opposite to the previous case of the coefficient K62. Consequently, the picture image information for the overlapped portion from the line buffers 56 and 60 that are processed in each coefficient circuits 62 and 66 undergo next the processing according to the coefficients K62 and K66, and are represented as the picture image information S62 and S66, as hatched in FIG. 8. The picture image information S62 and S66 from the coefficient circuit 62 and 66 that are coefficient processed in this manner are added in the adder 70. They are synthesized so as to coincide with the picture images in the original, as shown by picture image information S64 of FIG. 8, without any apparent unnatural look at the boundaries between each picture image information. The picture image information synthesized in this way is supplied from the adder 70 to the output line buffer, and is inserted between the picture image information for the unoverlapped portions that are supplied directly from the line buffers 56 and 60.

Figure 9:
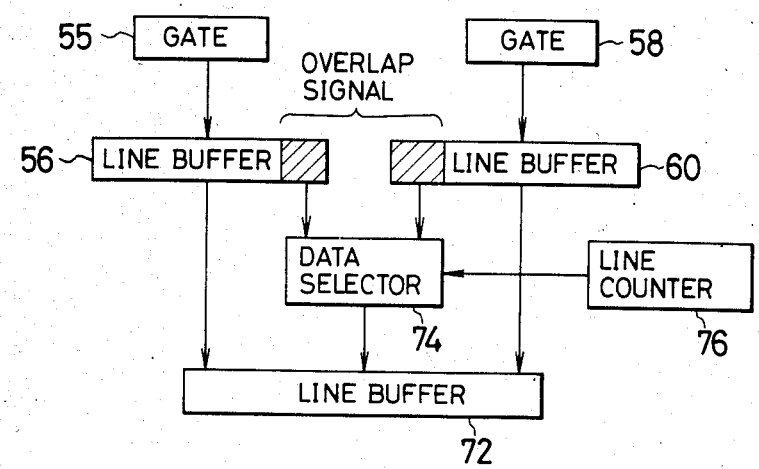
FIG. 9 is a block diagram for a modification to the picture image synthetic processing circuit in the first embodiment in accordance with the present invention.

Referring to FIG. 9, there is shown a modification to the picture image synthetic processing circuit in the first embodiment of the picture image reader in accordance with the present invention. In the first embodiment shown in FIG. 7, coefficient circuits and an adder are employed to synthetically process the picture images in the overlapped portion by weighting and averaging. In contrast, in the present embodiment, the preceding picture image information from the line buffer 56 and the succeeding picture image information from the line buffer 60 are alternately interposed with relatively small width, to form synthetic images by the use of a data selector 74 and a line counter 76.

Figure 10A:
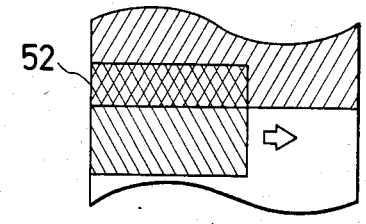
FIGS. 10a and 10b are the explanatory diagrams for illustrating the operation of the picture image synthetic processing circuit shown in FIG. 9.
Figure 10B:
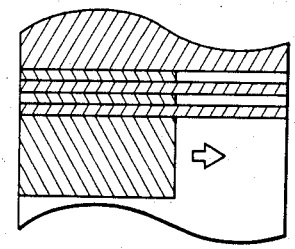

Namely, as shown in FIG. 10a, the overlapped portion 52 between a preceding picture image information that was obtained in a first reading operation and a succeeding picture image information that was read in a second reading operation, is divided, as shown in FIG. 10b, into a plurality of regions with small width in the reading width direction (that is, in the subscanning direction). By controlling the data selector 74 with the line counter 76, the preceding picture image information from the line buffer 56 and the succeeding picture image information from the line buffer 60 are taken out for each region in turn, to be supplied to the line buffer 64. In this manner, the picture image for the overlapped section is formed synthetically by alternately interposing narrow strips of the preceding picture image and the succeeding picture image.

By synthesizing narrow strips of both kinds of picture images through alternate interposing as in the above, one can form a synthesized picture image which is free from unnatural look that is conspicuous. This is due to taking advantage of the nature of human vision that when both kinds of picture images of strips that have width less than 6 lines/mm, say, are interposed alternately, the resultant picture image is perceived as an average of both.

Figure 11:
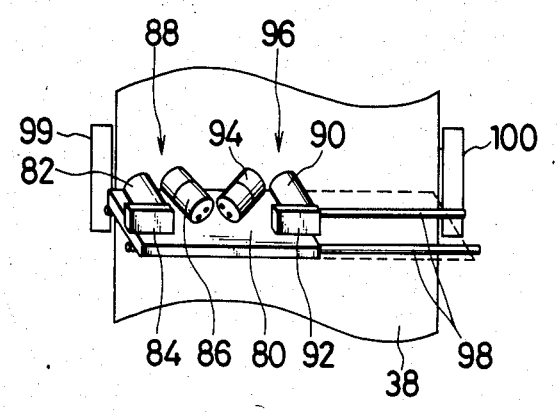
FIG. 11 is a simplified block diagram for the sensor section in a second embodiment of the picture image reader in accordance with the present invention.
Figure 12:
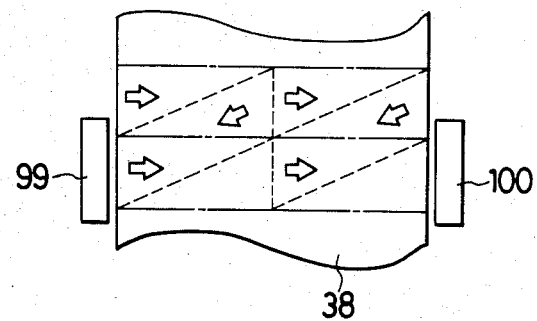
FIG. 12 is a simplified diagram for illustrating the operation of the second embodiment.

Referring to FIGS. 11 to 15, there is shown a second embodiment of the picture image reader in accordance with the present invention. As shown in FIG. 11, on top of the carriage 80, there are installed two reading units, namely, a first reading unit 88 which consists of a lens 82, a CCD sensor array 84, and a light source for illumination 86, and a second reading unit 96 which consists of a lens 90, a CCD sensor array 92, and a light source for illumination 94. With this set-up, the moving distance of the carriage 80 in the main scanning direction along the guide rails 98 can be reduced to one half of what would be required for the previous embodiment, as shown by FIG. 12, which means an improvement in the speed of reading processing in the main scanning direction. Moreover, on both sides of the original in the main scanning direction there are arranged white reference plates 99 and 100 consisting of white ceramic to be used for shading correction. When the carriage 80 is moved to the extreme left of the figure, the first reading unit 88 reads the white reference plate 99 on the left, and when the carriage 80 is moved to the right, the second reading unit 96 reads the white reference plate 100. By this arrangement, it is made to be able to correct for the picture image information read due to variations in the light intensity of the light sources for illumination.

With this construction, it is designed to have the light sources for illumination illuminate the original 38 obliquely from the side direction with respect to the lens and the CCD sensor array for picture image reading. Also, it can carry out the reading fast by reducing the moving distance of the carriage in the main scanning direction to one half of the case of single reading unit. Then, in contrast to the case of one reading unit in which the device has to be made large to the extent the light source is projected in the lateral direction when the carriage moves in the main scanning direction, miniaturization can be achieved in the present case of two reading units.

Although description of the present embodiment has been made in conjunction with the case of two reading units, it is not limited of course to that case only, and fast reading can be accomplished by providing a plurality of reading units.

The present embodiment realizes also a color facsimile device which employs series reading method in which the CCD sensor array is a linear array that composes one picture element with three dots of RGB formed by pasting three color filters of RGB to each dot. However, the CCD sensor array need not be limited to this construction only.

Figure 13:
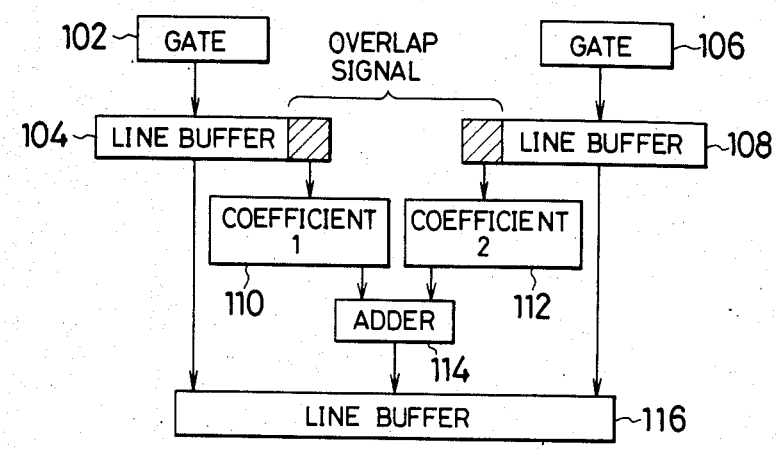
FIG. 13 is a block diagram for the second embodiment of the picture image synthetic processing circuit of the present invention.
Figure 14A:
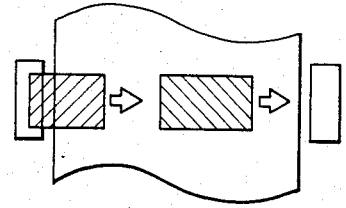
FIGS. 14a and 14b and FIG. 15 are diagrams for illustrating the operation of the picture image synthetic processing circuit shown in FIG. 13.
Figure 14B:
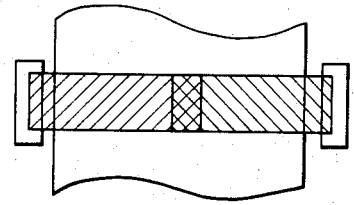
Figure 15:
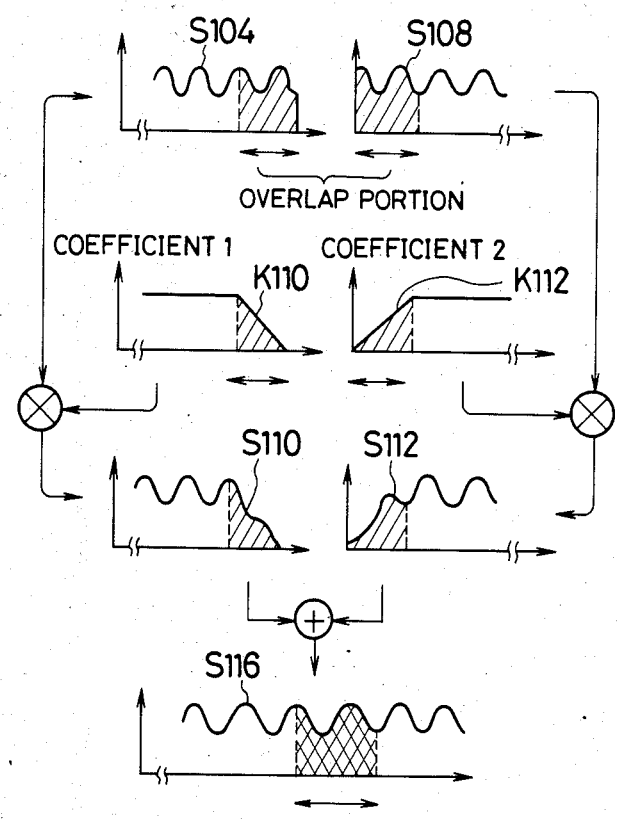

Referring to FIG. 13, there is shown the picture image synthetic processing circuit for the second embodiment. This processing circuit has two picture image reading units 88 and 96 in the main scanning direction, as shown by FIG. 11, and is designed to have the picture images read in the main scanning direction by the picture image rading units 88 and 96 to be arranged overlapped as shown in FIG. 14b. The picture image information for the overlapped section is synthetically processed by weighting and averaging as shown in FIG. 7 in order to prevent the conspicuous unnaturalness that will occur in the boundaries of the picture images due to differences in such things as the characteristics of the picture image reading units at left and right.

Namely, the picture image information that is read by the picture image reading unit 88 on the left is memorized in a line buffer 104 via a gate 102, and the picture image information that is read by the picture image reading unit 96 on the right is memorized in a line buffer 108 via a gate 106. Of the picture image information S104 and S108 that are memorized respectively by the line buffers 104 and 108, the portions that are hatched correspond to the picture image information that is read from the overlapped section. It should be noted that in FIG. 15 the abscissa for the curves that show each of the information corresponds to the main scanning direction. The picture image information S104 and S108 for the overlapped portion are supplied to a first and a second coefficient circuit 110 and 112 that possess respectively coefficients K110 and K112, similar to the coefficient circuits 62 and 66 of FIG. 7. The respective information is weighted with the coefficients K110 and K112 in the coefficient circuits 110 and 112, added in an adder 114 as weighted picture image information S110 and S112, and is supplied to an output line buffer 116 as a synthesized picture image information S116. A synthesized picture image formed in this way is free from unnaturalness in the boundary between the picture images so that the conspicuousness of the boundary can be removed.

Figure 16:
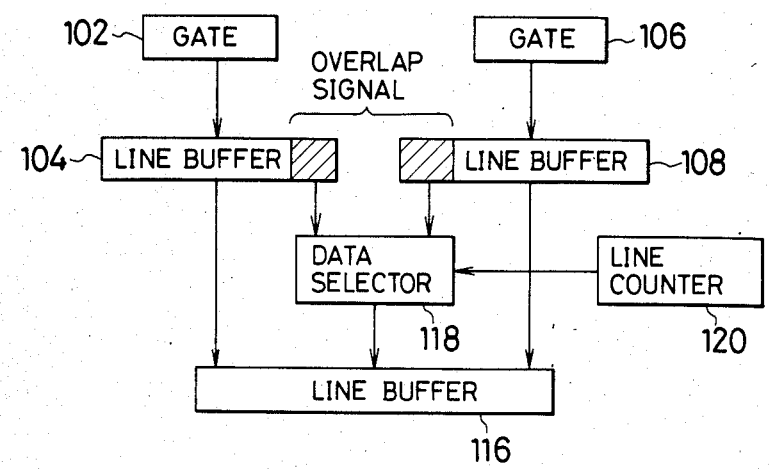
FIG. 16 is a block diagram for a modification to the picture image synthetic processing circuit in the second embodiment in accordance with the present invention.

Referring to FIGS. 16 and 17, there is shown a modification to the picture image synthetic processor in the second embodiment. In contrast to the synthetic processing in the second embodiment of weighting and averaging by means of coefficient circuits and an adder, the present picture image synthetic processor forms synthetic images by alternately interposing both picture image information of the overlapped section by means of a data selector 118 and a line counter 120, so that it corresponds to a modification to the first embodiemtn of the present invention.

Figure 17A:
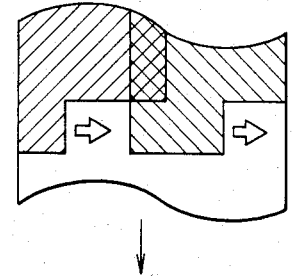
FIGS. 17a and 17b are diagrams for illustrating the operation of the picture image synthetic processing circuit shown in FIG. 16.
Figure 17B:
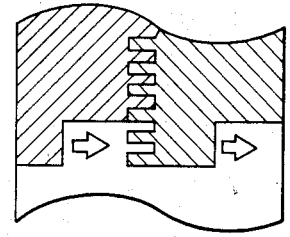

Namely, the overlapped section between the left-hand picture image information that is read by the left-hand picture image reading unit and the right-hand picture image information that is read by the right-hand picture image rading unit, as shown by FIG. 17a is picture image subdivided into a plurality of narrowly stripped regions in the subscanning direction, as shown in FIG. 17b. By controlling the data selector 118 with the line counter 120, a left-hand picture image information from the line buffer 104 and a righ-hand picture image information from the line buffer 108 are taken out in turn for each region, to be supplied to an output line buffer 116. Thus, a synthesized picture image for the overlapped section is formed by alternately interposing narrow strips of both kinds of picture images, as in the teeth of a comb. By the alternate interposing of the images as in the above, there can be formed a synthesized picture image which is free of unnaturalness with inconspicuous boundary. This is the result of applying the same property as in FIG. 9.

In each of the preceding embodiments, it was assumed that the position of the boundary for each picture image is fixed. However, it needs not be fixed so that it may be varied appropriately, for example, by the use of random numbers. By such variations, the boundary can be made more inconspicuous.

Referring to FIGS. 18 to 24, there is shown a third embodiment of the picture image reader in accordance with the present invention.

Figure 19:
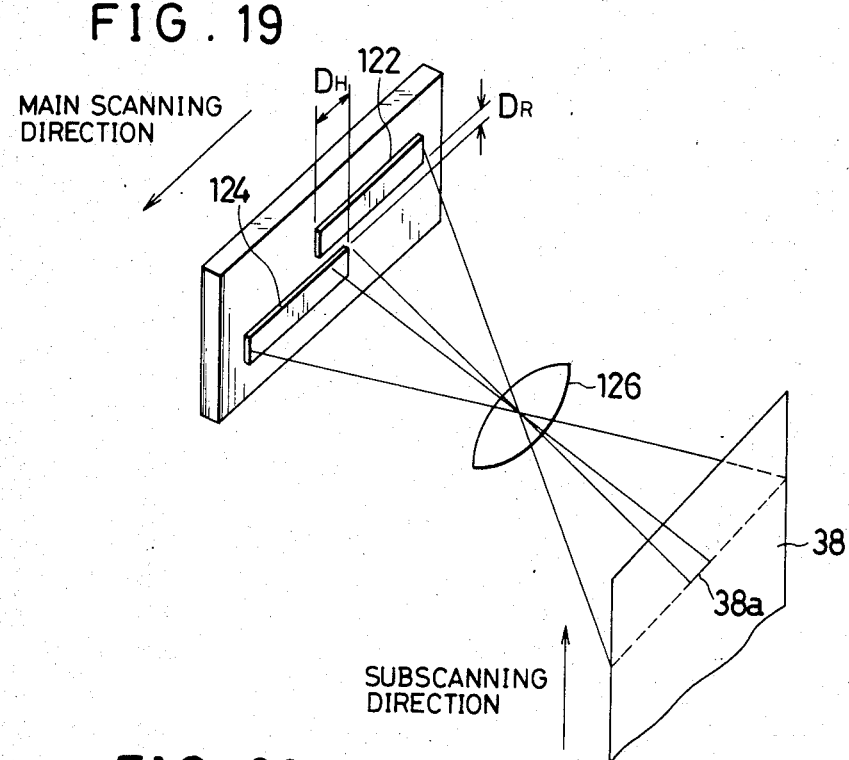
FIG. 19 is a simplified diagram for illustrating the structure of the sensor in the third embodiment shown in FIG. 18.

As shown in FIG. 19, in the third embodiment, use is made of two CCD line image sensors 122 and 124 with 3648 picture elements, arranged in the main scanning direction staggered so as to have an overlap of 64 picture elements. When picture images in an original of size A4 (210 mm width), for example, are read with such a line image sensor, it was found to be possible to realize a resolving power for reading of 34 dot/mm for monochromatic case and of 11 dot/mm for color reading of tricolor decomposition. Because of the gap $D_R$ (n times the reading pitch) in the subscanning direction between the line image sensors 122 and 124, as shown in FIG. 19, it becomes necessary to have a line memory for correcting the time delay that corresponds to the gap $D_R$. However, it is possible to reduce the image length by the use of a convergent rod lens array as an imaging lens 126, so that it is advantageous for miniaturization of the device.

With such a structure, a picture image on the original 38 is imaged with an overlap corresponding to the overlapping that has a length of $D_{II}$ (an amount of 64 picture elements) between the two line image sensors 122 and 124. The portion 38a of the image on the original 38 is called the overlapped imaging portion.

Figure 18:
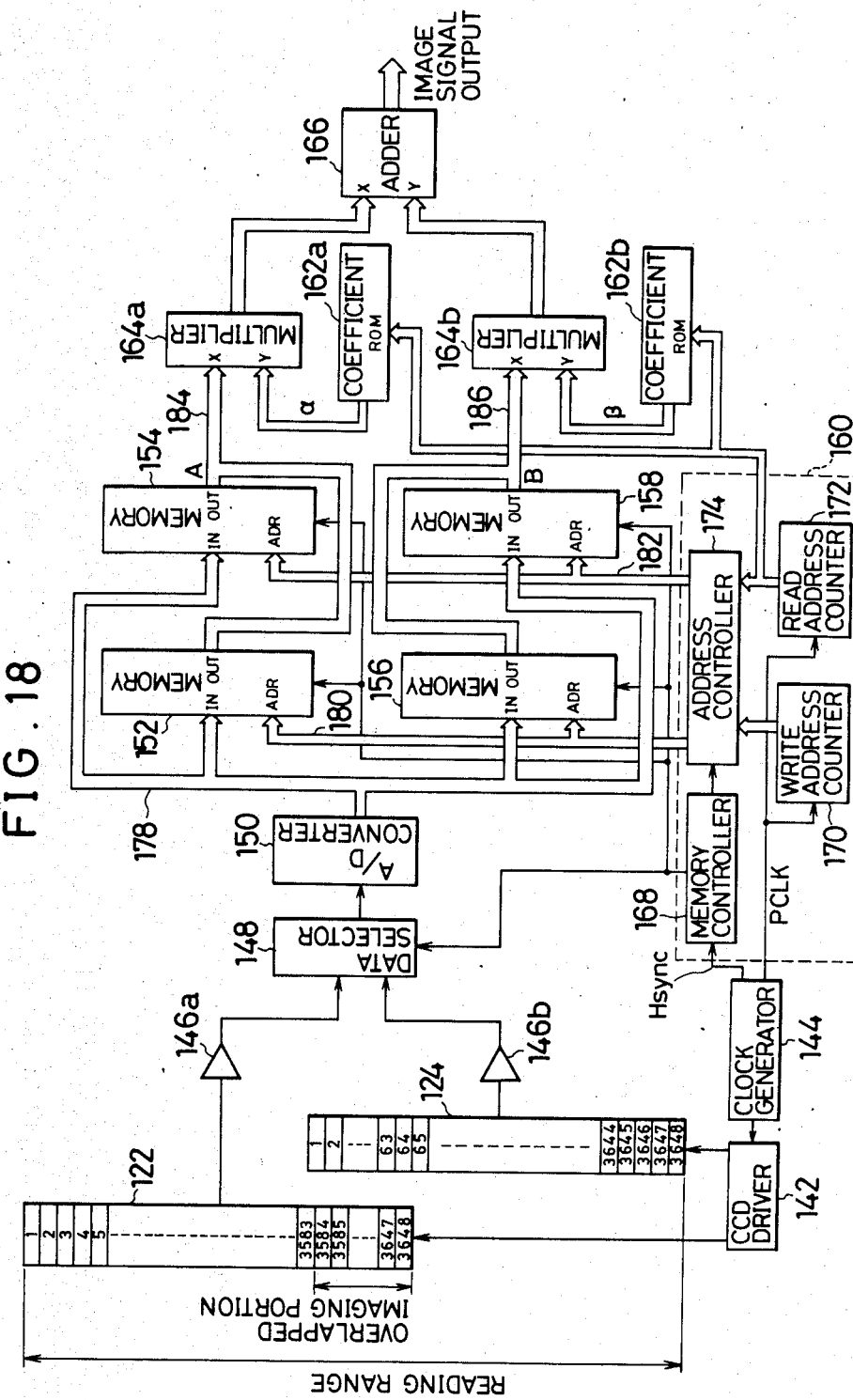
FIG. 18 is a block diagram for a third embodiment of the picture image synthetic processing circuit in accordance with the present invention.

Next, referring to FIG. 18, the picture image synthetic processing circuit in the third embodiment will be described.

The picture image synthetic processing circuit includes a clock generator 144 for outputting the drive clock signals to a CCD driver 142 to drive the CCD line image sensors 122 and 124, processing amplifiers 146a and 146b for processing the electrical signals taken out from the image sensors 122 and 124, a data selector 148 for selecting signals from the image sensors 122 and 124, an A/D converter 150 for A/D converting the signal from the data selector 148, memories 152, 154, 156, and 158 for memorizing the digital picture image signals from the A/D converter 150, a write/read control unit 160 for controlling the writing to and reading from the memories, coefficient ROM's 162a and 162b for generating coefficients, multipliers 164a and 164b for multiplying the picture image signals from the memories 152, 154, 156, and 158 with the coefficients from the coefficient ROM 162, and an adder 166 for adding the picture image signals from the multipliers 164a and 164b. Further, the write/read control unit 160 includes a memory controller 168, a write address counter 170, a read address counter 172, and an address controller 174.

In a picture image synthetic processing circuit with above structure, the clock image sensors 122 and 124 are driven via the CCD driver 142 by the clock from the clock generator 144, and outputs electrical signals that correspond to the picture images in the original 38. The output signals from the line image sensors 122 and 124 are input via the amplifiers 146a and 146b to the data selector 148, and are input selectively to the A/D converter 150 under the control of the memory controller 168. The data selector 148 is for common use for the output signals from the line image sensors 122 and 124, so that it will not be needed if the same number of A/D converters as the number of line image sensors are prepared. As the A/D converter 150, it will be appropriate to use one with 8 bits or so, for example.

The output data from the A/D converter 150 are sent out to a data bus with 8 bits, and the data corresponding to the output signals from the line image sensor 122 are written in the memory 152 or memory 154 while the data corresponding to the output signals from the line image sensor 124 are written in the memory 156 or the memory 158. The pair of memories 152 and 156 and the pair of memories 154 and 158 constitute respectively one-line memory, and these one-line memories carry out alternately the operations of writing and reading.

In more concrete terms, based on the picture element clock PCLK from the clock generator 144, there are generated write address and read address from the write address counter 170 and the read address counter 172, respectively. These addresses are applied alternately to the address 180 and 182 via address controller 174. Here, each of the memories 152 to 158 consists of a RAM, for example, of 4k byte capacity.

Figure 20:
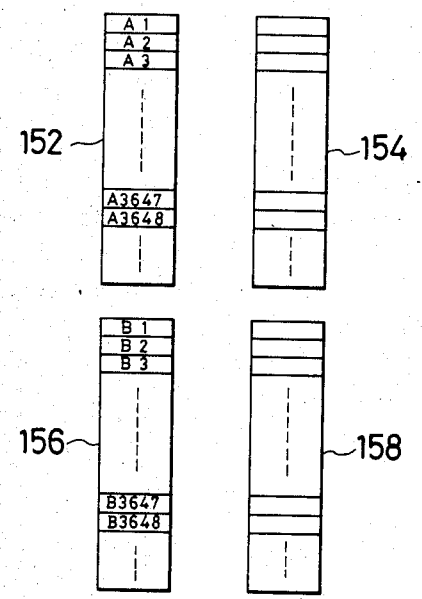
FIG. 20 is a diagram for illustrating the method of using memories in the picture image synthetic processing circuit shown in FIG. 18.
Figure 21:
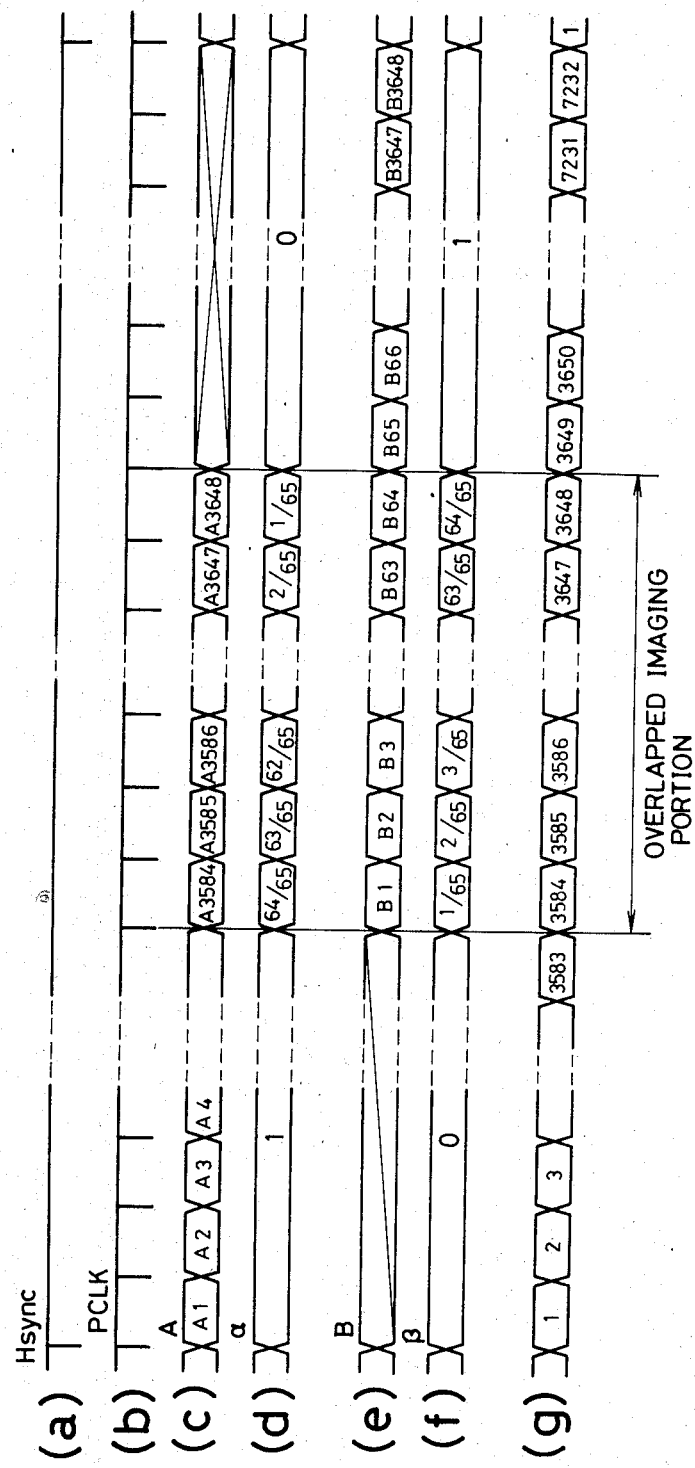
FIGS. 21a to 21g are time charts for the picture image synthetic processing operation.

In FIG. 20 is illustrated a state in which a quantity of data for one line is written in the one-line memory consisting of memories 152 and 156. Namely, in memory 152 there are written data A1, A2, . . . , A3648 that corresponds to the output signals from the line image sensor 122, and in memory 145 there are written data B1, B2, . . . , B3648 that corresponds to the output signals from the line image sensor 124. Data that will be transmitted thereafter will be written in the memories 154 and 158, and at the same time, the one line data that was written in the memories 152 and 156 as above will be read. With such a memory structure and its write and read operations, it becomes possible to have a fast continuous processing of the data corresponding to the continuous drive of the line image sensors 122 and 124. Also, sinal processing for generating picture image signals that correspond to the overlapped imaging portion 38a of the picture images of the original 38 will become easier as will be described later.

In order to generate the picture signals corrsponding to the overlapped imaging portion 38a of the picture images in the original 38, according to the present invention, the picture image data A that is read by the data bus 184 from the memories 152 and 154, and the picture image data B that is read by the data bus 186 from the memories 156 and 158 are input to the multipliers 164a and 164b, respectively. These image data are multiplicatively processed with the coefficients α and β that are generated by the coefficient ROM's 162a and 162b that are controlled by the read address from the read address counter 172. The output signals from the multipliers 164a and 164b are added in the adder 166 to form the output signal for picture image.

FIGS. 21a to 21g are timing charts that illustrate signal processing for generating picture image signals corresponding to the overlapped imaging portion. FIG. 21a shows the main scanning clock Hsync having identical period as the period for main scanning which is supplied to the memory controller 168 from the clock generator 144, FIG. 21b is the picture element clock PCKL, FIG. 21c is the picture image data A which is sent out to the data bus 184, FIG. 21d is the coefficient data α which is output from the coefficient ROM 162a, FIG. 21e is the picture image data B which is sent out to the data bus 186, FIG. 21f is the coefficient data β which is output from the coefficient ROM 162b, and FIG. 21g is the picture image signal output from the adder 166. The timing for each of the data shown in FIGS. 21c to 21g is the picture image signal output from the adder 166. The timing for each of the data shown in FIGS. 21c to 21g, is controlled by the addresses that are generated based on the picture element clock PCLK of FIG. 21b. These addresses are the picture element addresses that correspond to the mechanical positions in the main scanning direction.

As for the signal processing for generating picture image signals that correspond to the overlapped imaging portion, the last 64 picture elements of the picture image A and the first 64 picture elements of the picture image data B are read simultaneously. They are multiplied in the multipliers 164a and 164b by the coefficients α and β that are read with the same timing from the coefficient ROM's 162a and 162b, respectively. Then, the results of the multiplications are added (mixed) in the adder 166 to be read as the picture image signal. Here, the values of the coefficient data α and β, that is, the mixing ratio of the picture image data A and the picture image data B, are set to α=1 and β=0 for the duration in which only the picture image data A in the first half of one line is effective, and are set to α=0 and β=1 for the duration in which only the picture image data B in the latter half of one line is effective. In addition, for the intermediate portion of one line, namely, for the duration that corresponds to the overlapped imaging portion, α and β are varied in the main scanning direction so as to keep α+β=1.

When the content of the picture image signals shifts from that of the picture image data A to that of the picture image data B, it is general to move from a state in which the proportion of the picture image data A (namely, α/(α+β)) is large to a state in which the proportion of the picture image data B (β/(α+β)) is increased gradually. Although a variety of patterns for this shift may be considered, one needs only to pick up one pattern which is appropriate in view of the characteristics of the line image sensors, the characteristics of the human vision, and so forth.

Figure 22A:
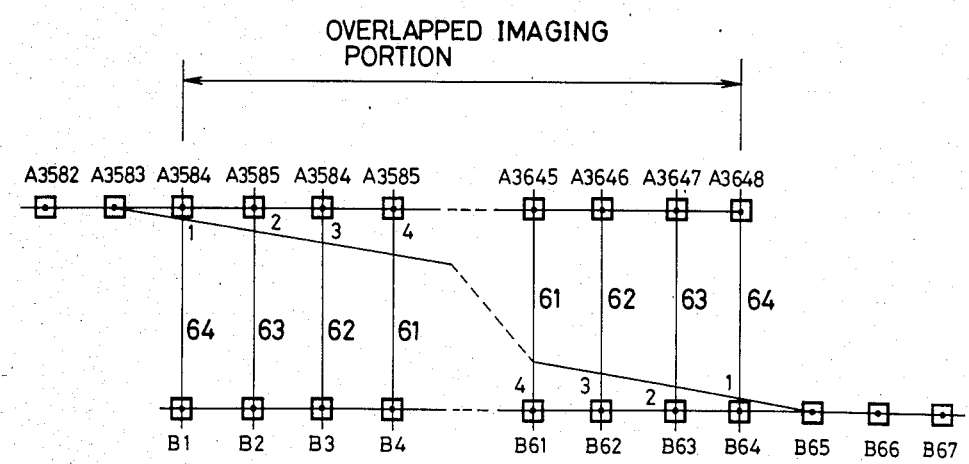
FIGS. 22a to 22d are diagrams showing the patterns of picture image synthetic processing.
Figure 22B:
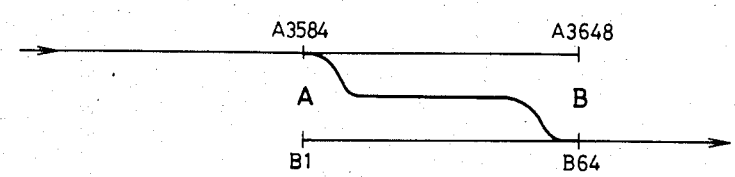
Figure 22C:
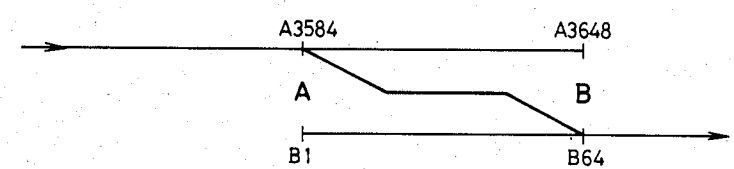
Figure 22D:
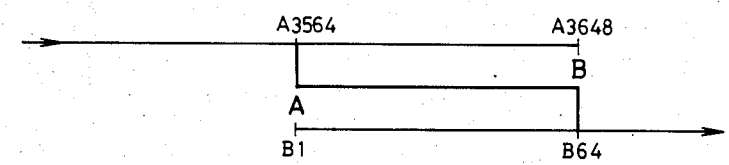

FIGS. 22a to 22d illustrate concrete examples to the pattern of transition from the picture image data A to the picture image data B. FIG. 22a corresponds to the case in which the mixing ratio of the picture image data A and B for the overlapped imaging portion is varied linearly in the main scanning direction, FIG. 22b is the case in which after the mixing ratio is varied gradually initially it is kept at a constant value (α=β) for a fixed length of time, and then again it is varied gradually, FIG. 22c is the case in which after the mixing ration is varied linearly initially it is kept at a const value (α=β) for a fixed duration, and then again it is varied linearly, and FIG. 22d corresponding to the case in which the mixing ratio for the overlapped imaging portion is set at a fixed value (α=β), that is, the case of averaging the picture image data A and B. Each of these patterns can readily be obtained by changing the contents of the coefficient ROM's 162a and 162b.

Figure 23:
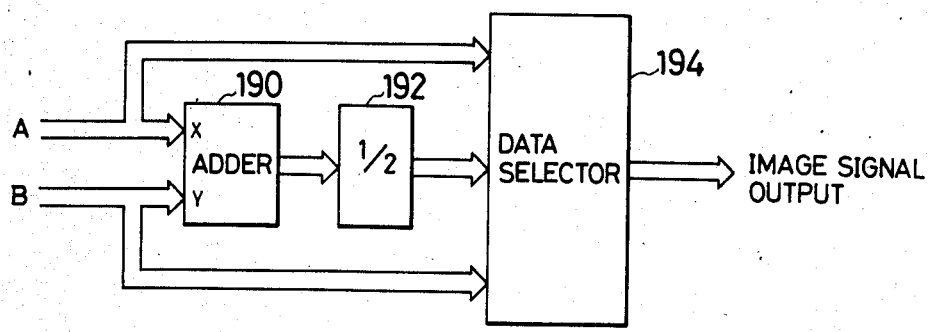
FIG. 23 is a block diagram for a modification to the picture image synthetic processing unit in the third embodiment.
Figure 24:
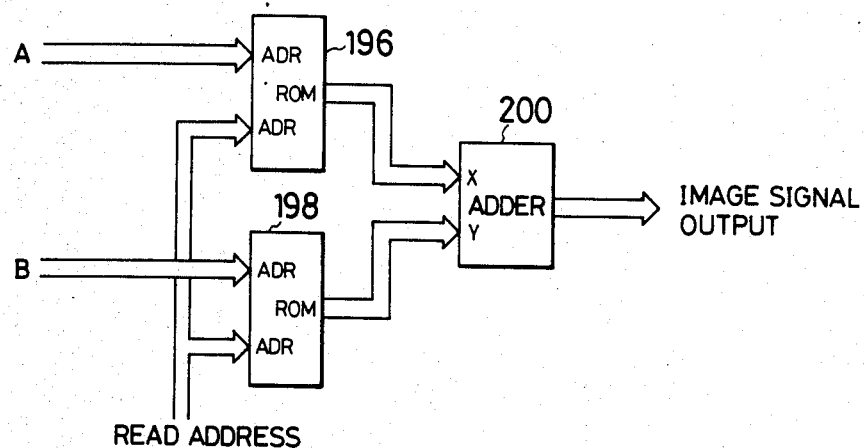
FIG. 24 is a block diagram for another modification to the picture image synthetic procssing unit in the third embodiment.
Figure 25:
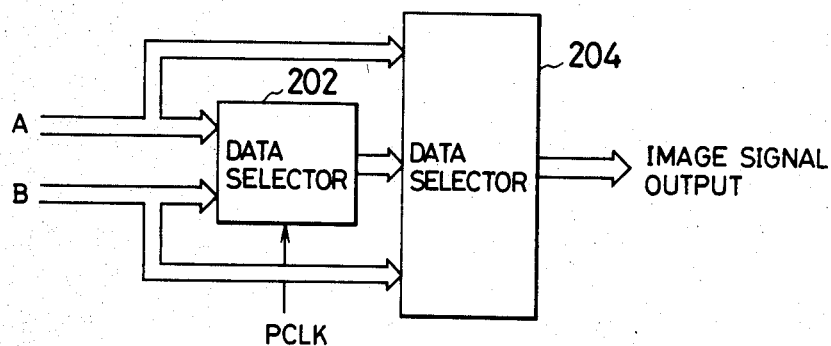
FIG. 25 is a block diagram for still another modification to the picture image synthetic processing unit in the third embodiment.

FIGS. 23 to 25 show other modifications to the signal processing means for generating picure image signals corresponding to the overlapped imaging portion. FIG. 23 shows a more realistic structure for the case of making transition from the picture image data A to the picture image data B in accordance with the pattern of FIG. 22d. Here, after the picture image data A and B are added in an adder 190 and the result is halved in a coefficient multiplier 192, and the outcome is introduced to a data selector 194 along with the picture image data A and B. It is arranged that picture data A and B are to be selected during the period when the picture image data A and the picture image data B, respectively, are effective, and the mean data output from the coefficient multiplier 192 is to be selected during the period corresponding to the overlapped imaging portion which is in between the above two periods. The coefficient multiplier 192 can be realized in practice by the operation of shifting the bits. With this construction, a circuit can be realized in general without the use of a costly multiplier with large circuit scale, which is advantageous in view of miniaturization and cost reduction for the device.

FIG. 24 is another modification in which the use of a multiplier is avoided. Here, the portion corresponding to the multiplier 164a and the coefficient ROM 162a of FIG. 18 is replaced by a ROM 196, and the portion corresponding to the multiplier 164b and the coefficient ROM 162b is replaced by a ROM 198. An adder 200 is what corresponds to the adder 166 of FIG. 18. The ROM's 196 and 198 are tabulations of the levels of the picture image signals corresponding to the overlapped imaging portion in accordance with the address signals from the read address counter 172. These ROM's require a capacity in proportion to the number of picture elements that correspond to the overlapped imaging portion. In view of the recent trend of drastic reduction in the price of ROM's with large capacity, this modification will be more favorable for reducing both of cost and hardware than the system that employs a multiplier, provided that the number of picture elements corresponding to the overlapped imaging portion lies within an appropriate range.

FIG. 25 shows a system in which there is provided a data selector 202 that selects the picture image data A and B in turn for each picture element, under the control of the picture element clock PCLK. In addition, there is provided another data selector 204, and it is arranged that the data selector 204 takes out the picture image data A and B during the period when the picture image data A and B, respectively, are effective, and takes out the output data of the data selector 202 for the duration of overlapped imaging. By such an arrangement, it is possible, so far as the vision is concerned, to obtain effects that are nearly similar to those for the case of taking the mean of the picture image data A and B for the period of overlapped imaging. It should be noted that in the present example, it is designed to take out in turn one picture element each of the picture image data A and B during the period of overlapped imaging. More generally, however, it may be arranged to take out in turn m picture elements of the picture image data A and n picture elements of the picture image data B. Here, m and n can be arbitrary integers, and naturally it may be chosen m=n. With such a construction, the desired object can be achieved by the mere switching between the data selectors such that it will become possible to simplify further the construction of the circuit.

Now, the present invention is by no means limited to the above embodiment. Thus, for example, in the present invention, the signal processing for generating picture image signals corresponding to the overlapped imaging portion has been arranged to be applied to the signals that are digitalization of the output signals from the line image sensors 122 and 124 by means of an A/D converter. However, the signal processing may be given in a signal processing system in a subsequent stage. For instance, in a color picture image reader for obtaining color copies or the like, it is general to process the picture image signals that are digitalized by the A/D converter by letting them go through a shading correction circuit, a matrix operation circuit, or the like. However, the signal processing for generating picture image signals corresponding to the overlapped imaging portion may be applied entirely equally to the singals that have undergone the correction by means of a shading correction circuit, as well as to the signals that have been converted to the luminance signals and the color difference signals by means of a matrix operation circuit.

Moreover, various modifications to the foregoing embodiments will become possible without departing from the scope of the present invention.

What is claimed is:

1. A picture image reader which reads picture image information in an original by illuminating the original with light and by receiving the transmitted or reflected light from the original, comprising:
   (a) sensing means for reading picture image information by receiving the light from the original which is illuminated;
   (b) moving means for relatively moving said sensing means to the original;
   (c) overlapping means for overlapping portions of reading picture images in the picture image reading by said sensing means; and
   (d) synthetic picture image formation means for synthesizing picture images of the overlapped portion so as to obtain the picture images coinciding with the picture images in the original, based on each of the picture image information that is read by overlapping the picture images with said sensing means.

2. A picture image reader as claimed in claim 1, in which said synthetic picture image formation means comprises a weighting means for multiplying each of the picture image information of the overlapped portion by respective predetermined coefficients, and an adding means for summing the multiplied picture image information.

3. A picture image reader as claimed in claim 2, in which said overlapping means comprises a control unit for controlling said moving means so as to have said sensing means read a portion of the picture image reading region in an overlapped manner 4. A picture image reader which reads picture image information in an original by illuminating the original with light and by receiving the transmitted or reflected light from the original, comprising:
   (a) sensing means for reading picture image information by receiving the light from the original which is illuminated;
   (b) moving means for relatively moving said sensing means to the original;
   (c) overlapping means for overlapping portions of reading picture images in the picture image reading by said sensing means; and
   (d) synthetic picture image formation means for synthesizing picture images of the overlapped portion so as to obtain the picture images coinciding with the picture images in the original, based on each of the picture image information that is read by overlapping the picture images with said sensing means, said synthetic picture image formation means comprising a weighting means for multiplying each of the picture image information of the overlapped portion by respective predetermined coefficients, and an adding means for summing the multiplied picture image information, said overlapping means comprising a control unit for controlling said moving means so as to have said sensing means read a portion of the picture image reading region in an overlapped manner, said moving means comprising a sensor transporting mechanism which lets said sensing means scan in a first direction with respect to the original and an original transporting mechanism which transports the original so as to let said sensing means move in a second direction perpendicular to the first direction relative to the original whenever said sensing means completes scanning in the first direction, and the control unit controls the original transporting mechanism to move the original in the second direction by a distance smaller than the reading width in the second direction of said sensing means so as to let said sensing means read the reading region of picture images in an overlapped manner.

5. A picture image reader as claimed in claim 4, in which the sensor transporting mechanism comprises a carriage for housing the sensing means in its inside, guide rails for guiding the carriage in the first direction, and a first motor for moving the carriage via a pulley and a belt, the original transporting mechanism comprising rollers for holding the original between them to feed it in the second direction and a second motor for driving the rollers, and the control unit comprising a microcomputer, I/O ports, and drivers for controlling the first motor so as to move the sensing means scan in the first direction relative to the original, as well as for controlling the second motor to move the original in the second direction by a distance which is smaller than the reading width Wr in the second direction of said sensing means so as to let said sensing means read the reading region of picture images in overlapped manner.

6. A picture image reader as claimed in claim 4, in which the weighting means comprises at least two coefficient circuits for weighting each of the picture image information of the overlapped portion by multiplying them respectively with predetermined coefficients, and the adding means comprising an adder for summing the weighted picture image information obtained from each of the coefficient circuits.

7. A picture image reader as claimed in claim 6, in which said synthetic picture image formation means further comprises a first gate for inputting a preceding picture image information read by the n-th ($n \geq 1$) reading operation of the sensor, a second gate for inputting a succeeding picture image information read by the $(n+1)$-th reading operation of the sensor, a first line buffer for memorizing the picture image information from the first gate in the second direction to outputting the predetermined picture image information of the overlapped portion to the first coefficient circuit, a second line buffer for memorizing the picture image information from the second gate in the second direction to outputting the predetermined picture image information of the overlapped portion to the second coefficient circuit, and an output line buffer for memorizing and outputting the picture image information of the nonoverlapped portion from the first and second line buffers and the picture image information of the overlapped portion from the adder.

8. A picture image reader as claimed in claim 1, in which said synthetic picture image formation means comprises a division control means for subdividing the overlapped portion into a plurality of narrowly stripped regions, and an arranging means for arranging both picture image information of the overlapped portion alternately in the area subdivided into the plurality of narrow regions by the division control means.

9. A picture image reader as claimed in claim 8, in which the division control means comprises a line counter and the arranging means comprising a data selector.

10. A picture image reader as claimed in claim 4, in which said sensor means comprises a rod array lens whose one end is arranged closely facing the original, having an array construction long in the subscanning direction with reading width of Wr, and a CCD sensor array which is arranged in close contact with the other end of the rod array lens, having an array construction, with reading width of Wr, consisting of a plurality of sensors arranged in series in the second direction, similar to the rod array lens.

11. A picture image reader as claimed in claim 4, in which said sensor means comprises a first reading unit and a second reading unit, the first reading unit consisting of a lens, a CCD sensor array, and a light source for illumination, the second reading unit consisting of a lens, a CCD sensor array, and a light source for illumination, and the first and second reading units being arranged side by side in the first direction.

12. A picture image reader as claimed in claim 2, in which said sensing means comprises an array of a plurality of line image sensors that are constructed by arranging a plurality of photoelectric conversion elements in a line, and said overlapping means comprising a rod array lens which is arranged so as to have the images of a portion of the picture image of the original overlapped on the line image sensors of at least two in number.

13. A picture image reader as claimed in claim 12, in which the weighting means comprises at least two of coefficient ROM's for generating predetermined coefficients and at least two of multipliers for multiplying each of the picture image information for the overlapped portion by the coefficients from the respective coefficient ROM's, and the adding means comprising an adder for summing the weighted picture image information from the respective multipliers.

14. A picture image reader which reads picture image information in an original by illuminating the original with light and by receiving the transmitted or reflected light from the original, comprising:
 (a) sensing means for reading picture image information by receiving the light from the original which is illuminated;
 (b) moving means for relatively moving said sensing means to the original;
 (c) overlapping means for overlapping portions of reading picture images in the picture image reading by said sensing means; and
 (d) synthetic picture image formation means for synthesizing picture images of the overlapped portion so as to obtain the picture images coinciding with the picture images in the original, based on each of the picture image information that is read by overlapping the picture images with said sensing means, said synthetic picture image formation means comprising a weighting means for multiplying each of the picture image information of the overlapped portion by respective predetermined coefficients, and an adding means for summing the multiplied picture image information, said sensing means comprising an array of a plurality of line image sensors that are constructed by arranging a plurality of photoelectric conversion elements in a line, said overlapping means comprising a rod array lens which is arranged so as to have the images of a portion of the picture image of the original overlapped on the line image sensors of at least two in number, said weighting means comprising at least two of coefficient ROM's for generating predetermined coefficients and at least two of multipliers for multiplying each of the picture image information for the overlapped portion by the coefficients from the respective coefficient ROM's, and said adding means comprising an adder for summing the weighted picture image information from the respective multipliers, the coefficients $\alpha$ and $\beta$ of the two coefficient ROM's being set to $\alpha=1$ and $\beta=0$ for the duration of the first half of one line in which the picture image data A alone is effective, to $\alpha+\beta=1$ for the duration at the middle of one line that corresponds to the overlapped portion, and to $\alpha=0$ and $\beta=1$ for the duration of the latter half of one line in which the picture image B alone is effective.

15. A picture image reader which reads picture image information in an original by illuminating the original with light and by receiving the transmitted or reflected light from the original, comprising:
 (a) an optical sensor for reading picture image information by receiving the light from the original which is illuminated;
 (b) an optical sensor transporting mechanism which causes said optical sensor scan in the first direction with respect to the original;
 (c) an original transporting mechanism for transporting the original so as to move the original in a second direction perpendicular to the first direction relative to the original, whenever said optical sensor completes scanning in the first diredction;
 (d) a control unit for controlling the original transporting mechanism so as to move the original in the second direction by a distance smaller than the reading width Wr in the second direction of said optical sensor, in order to let said optical sensor read the reading region of picture images in the overlapped manner; and
 (e) a synthetic picture image formation means for synthesizing a picture image of the overlapped portion so as to have the picture image coincident with the picture image in the original, based on each picture image information that is read in overlapped manner by said optical sensor,
 (f) said synthetic picture image formation means comprises at least two of coefficient circuits for weighting through multiplication of each of the picture image information of the overlapped portion with respective predetermined coefficients, and an adder for summing the weighted picture image information from each of the coefficient circuits.

16. A picture image reader which reads picture image information in an original by illuminating the original with light and by receiving the transmitted or reflected light from the original, comprising:
 (a) an optical sensor formed by placing a plurality of line image sensors, each constructed by arranging a plurality of photoelectric conversion elements in a line, in the main scanning direction, in order to have the images of a portion of the picture image in the original in overlaped manner;
 (b) a moving mechanism for relatively moving said optical sensor and the original;
 (c) a synthetic picture image formation mechanism for synthesizing picture image for the overlapped portion so as to have the picture image coincident with the picture image in the original, based on the picture image information that is read overlapped by said optical sensor, and
 (d) said synthetic picture image formation means comprises at least two of coefficient ROM's for generating predetermined coefficients, at least two of multipliers for multiplying each of the picture image information for the overlapped portion with the coefficients from respective coefficient ROM's, and an adder for summing the weighted picture image information from each of the multipliers.

17. A picture image reader which reads picture image information in an original by illuminating the original with light and by receiving the transmitted or reflected light from the original, comprising:

(a) sensing means for reading picture image information by receiving the light from the original which is illuminated;

(b) moving means for relatively moving said sensing means to the original;

(c) overlapping means for overlapping portions of reading picture images in the picture image reading by said sensing means; and (d) synthetic picture image formation means for synthesizing picture images of the overlapped portion so as to obtain the picture images coinciding with the picture images in the original, based on each of the picture image information that is read by overlapping the picture images with said sensing means, said synthetic picture image formation means comprising a division control means for subdividing the overlapped portion into a plurality of narrowly stripped regions, and an arranging means for arranging both picture image information of the overlapped portion alternately in the area subdivided into the plurality of narrow regions by the division control means.

18. A picture image reader as claimed in claim 17, in which the division control means comprises a line counter and the arranging means comprises a data selector.

* * * * *